United States Patent [19]

Hiasa et al.

[11] Patent Number: 4,672,924
[45] Date of Patent: Jun. 16, 1987

[54] TWO-CYCLE ENGINE

[75] Inventors: Toshikazu Hiasa, Miyoshimachi; Hiroyuki Uchida, Oimachi, both of Japan

[73] Assignee: Honda Giken Kogyo Kabushiki Kaisha, Japan

[21] Appl. No.: 840,313

[22] Filed: Mar. 17, 1986

[30] Foreign Application Priority Data

Mar. 26, 1985 [JP] Japan ................................. 60-61604
Mar. 26, 1985 [JP] Japan ................................. 60-43673

[51] Int. Cl.$^4$ ............................................. F02B 75/02
[52] U.S. Cl. ............................... 123/65 PE; 123/65 V
[58] Field of Search ............. 123/65 PE, 65 V, 65 P, 123/65 PD, 65 EM

[56] References Cited

U.S. PATENT DOCUMENTS

| | | | |
|---|---|---|---|
| 4,121,552 | 10/1978 | Mithuo et al. | 123/65 V |
| 4,202,297 | 5/1980 | Oku et al. | 123/65 PE |
| 4,285,311 | 8/1981 | Iio | 123/73 V |
| 4,321,893 | 3/1982 | Yamamoto | 123/65 V |
| 4,341,188 | 7/1982 | Nerstrom | 123/65 PE |
| 4,364,346 | 12/1982 | Shiohara | 123/65 PE |
| 4,368,703 | 1/1983 | Shibata | 123/65 P |

FOREIGN PATENT DOCUMENTS

| | | | |
|---|---|---|---|
| 0141650 | 5/1985 | European Pat. Off. | 123/65 PE |
| 0126812 | 10/1979 | Japan | 123/65 V |
| 0158514 | 12/1979 | Japan | 123/65 PE |

Primary Examiner—Craig R. Feinberg
Assistant Examiner—David A. Okonsky
Attorney, Agent, or Firm—Darby & Darby

[57] ABSTRACT

A two-cycle engine includes a pair of first and second valves movable into and out of respective closed positions where the first and second valves close part of an exhaust port to vary an exhaust timing thereof. Power transmission means includes a pair of first and second shafts angularly movable about their respective axes disposed parallel to an axis of a cylinder and each having a pinion portion. A rack rod is movable along an axis thereof perpendicular to the axis of the cylinder, the rack rod having first and second rack portions meshingly engaging the pinion portions of the first and second shafts, respectively, in such a manner that the angular movement of the first shaft causes the angular movement of the second shaft through the rack rod. A pair of first and second levers of a generally L-shape defined by a pair of perpendicularly-disposed first and second arms has a corner portion where the first and second arms merge. Each lever is angularly movable about an axis passing through the corner portion and disposed parallel to the shafts. The first and second arms of each lever is engaged respectively with a respective one of the first and second valves and a respective one of the first and second shafts in such a manner that the angular movements of the first and second shafts cause the angular movements of the first and second levers, respectively, to move the first and second valves into and out of their closed positions.

8 Claims, 12 Drawing Figures

TWO-CYCLE ENGINE

BACKGROUND OF THE INVENTION

1. Field of the Invention

This invention relates to a two-cycle engine with means for controlling a port timing in accordance with the engine speed and more particularly to drive means for operating the port timing control means.

2. Related Art

It has been proposed to control or vary an exhaust port timing in accordance with the engine speed to improve power output over an entire effective range of the engine speed. Japanese patent application No. 60-3722 discloses one conventional port timing control device shown in FIG. 1 which comprises a pair of first and second port timing control valves 100 and 102 movable into and out of their respective closed positions where the first and second valves 100 and 102 cooperate with each other to close an upper portion of an exhaust port 104 to thereby delay an exhaust timing, that is to say, the opening of the exhaust port 104 by a piston 106 reciprocally moving along a cylinder 108, and drive means for moving the first and second valves 100,102 into and out of their respective closed positions along respective straight paths disposed perpendicular to the axis of the cylinder 108.

The drive means comprises an actuator 110 such as a motor, a rod 112 movable along an axis thereof and having a pair of first and second rack portions 112a and 112b on opposite ends portions, a first lever 114 fixedly mounted at one end on a rotatable output shaft 110a of the actuator 110, a first pinion 116 fixedly mounted on the upper end of the output shaft 110a of the actuator 110 and disposed in mesh with the first rack portion 112a, a second lever 118 fixedly mounted at one end on a rotatably shaft 120, and a second pinion 122 fixedly mounted on the upper end of the shaft 120 and disposed in mesh with the second rack portion 112b. Each of the first and second levers 114 and 118 has a slot 124 at the other end in which a pin 126, secured to each of the first and second valves 100 and 102, is slidably received. When the engine speed reaches a predetermined level, the actuator 110 is operated to rotate or angularly move its output shaft 110a about its axis, so that the first lever 114 is angularly moved counterclockwise as indicated by an arrow A (FIG. 1) to move the first valve 100 out of its closed position, that is, away from the exhaust port 104. At the same time, the second lever 118 is angularly moved clockwise as indicated by an arrow B (FIG. 1) through the first pinion 116, the rod 112 and the second pinion 122 to thereby move the second valve 102 out of its closed position in synchronism with the movement first valve 100, so that the exhaust port 104 is fully opened. The conventional drive means has been found not entirely satisfactory, however, in that the width L of the engine is increased since the rod 112 and the first and second levers 114 and 118 are considerably extended in the direction of the width of the engine, so that the overall size of the engine is increased. In addition, where the engine having such a relatively large width is mounted on a motorcycle M (FIG. 2), a cover member C, attached to the side of the cylinder block 128 at a position corresponding to the rod 112, is extended in the direction of the width of the motorcycle M to limit a space available for accommodating an exhaust pipe P. And, if the exhaust pipe P is arranged to pass over the cover member C as shown in FIG. 2, then a space for accommodating a radiator R is limited. As a result, the size of the radiator R and hence its capacity must be limited.

Further, since the drive means is composed of not a few component parts, there are occasions when the first and second valves 100 and 102 can not be brought accurately into their respective predetermined closed positions even if these component parts are manufactured within tolerance limits. Therefore, it has been desired to provide means by which the respective closed positions of the first and second valves 100 and 102 can easily be adjusted properly.

SUMMARY OF THE INVENTION

It is therefore an object of this invention to provide a two cycle engine incorporating means for operating port timing control valves which will not unduly increase the size of the engine.

Another object is to provide such an engine in which the respective closed positions of the control valves can be easily adjusted properly.

According to the present invention, there is provided a two-cycle engine comprising:

(a) a cylinder block including a cylinder having an axis, and an exhaust port formed in a side wall of said cylinder;

(b) a piston received in said cylinder for reciprocal movement along the axis of said cylinder for closing and opening said exhaust port; and (c) port timing control means for varying a timing of the opening of said exhaust port by said piston, said port timing control means comprising (i) a pair of first and second valves movable along respective straight paths disposed generally perpendicular to the axis of said cylinder into and out of respective closed positions where said first and second valves cooperate with each other to close part of said exhaust port; (ii) power transmission means; and (iii) drive means for driving said first and second valves to move into and out of their respective closed positions in accordance with a speed of said engine through said power transmission means;

(d) said power transmission means comprising (i) a pair of first and second shafts mounted on said cylinder block for angular movement about their respective axes disposed generally parallel to the axis of said cylinder, each of said shafts having a pinion portion; (ii) a rack rod disposed generally perpendicular to said shafts and being movable along an axis thereof, said rack rod having a pair of first and second rack portions spaced along the length thereof and meshingly engaging said pinion portions of said first and second shafts, respectively, in such a manner that the angular movement of said first shaft causes the angular movement of said second shaft through said rack rod; (iii) a pair of first and second levers of a generally L-shape defined by a pair of a first arm and a second arm extending generally perpendicularly from said first arm, each of said levers having a corner portion where said first and second arms merge, each lever being angularly movable about an axis passing through said corner portion and disposed generally parallel to said shafts, said first and second arms of each lever being engaged respectively with a respective one of said first and second valves and a respective one of said first and second shafts in such a manner that the angular movements of said first and second shafts cause the angular movements of said first and second levers, respectively, to move said first and second valves into and out of their closed positions, and said first shaft being operatively connected to said drive means for being driven for angular movement.

DESCRIPTION OF THE PREFERRED EMBODIMENTS OF THE INVENTION

Figure 1:
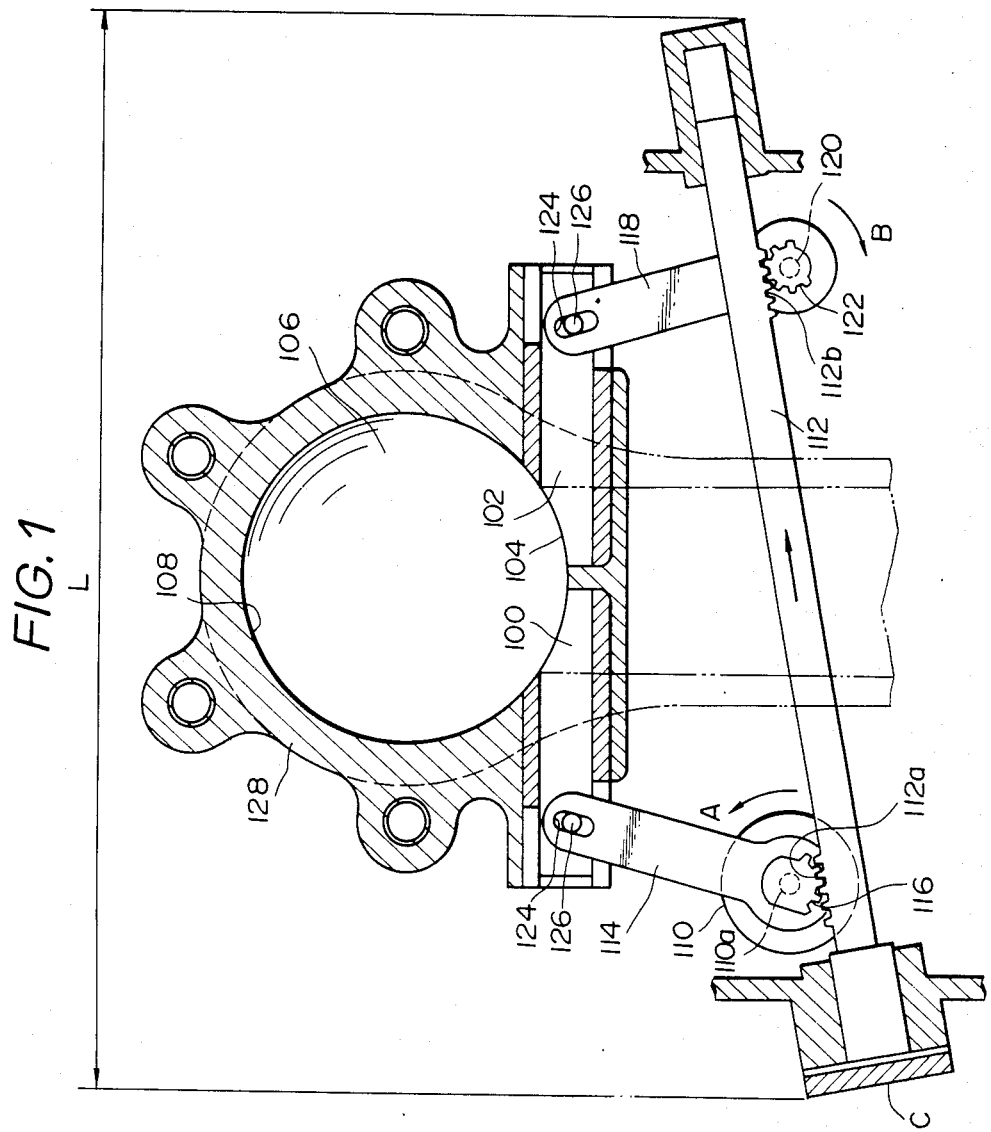
FIG. 1 is a cross-sectional view of a two-cycle engine.
Figure 2:
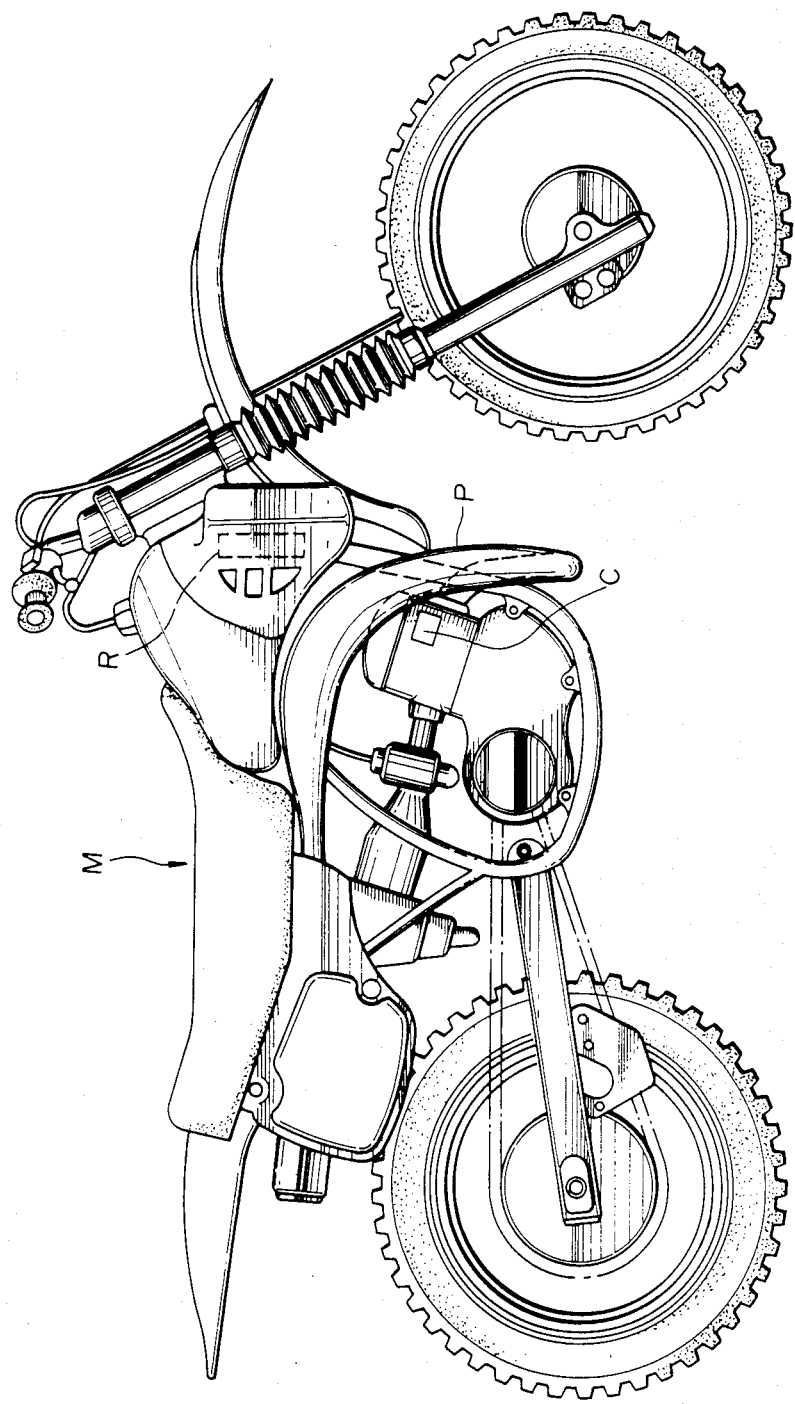
FIG. 2 is a side-elevational view of a motorcycle incorporating the engine of FIG. 1.

The invention will now be described with reference to the drawings in which like reference numerals denote corresponding parts in several views.

Figure 3:
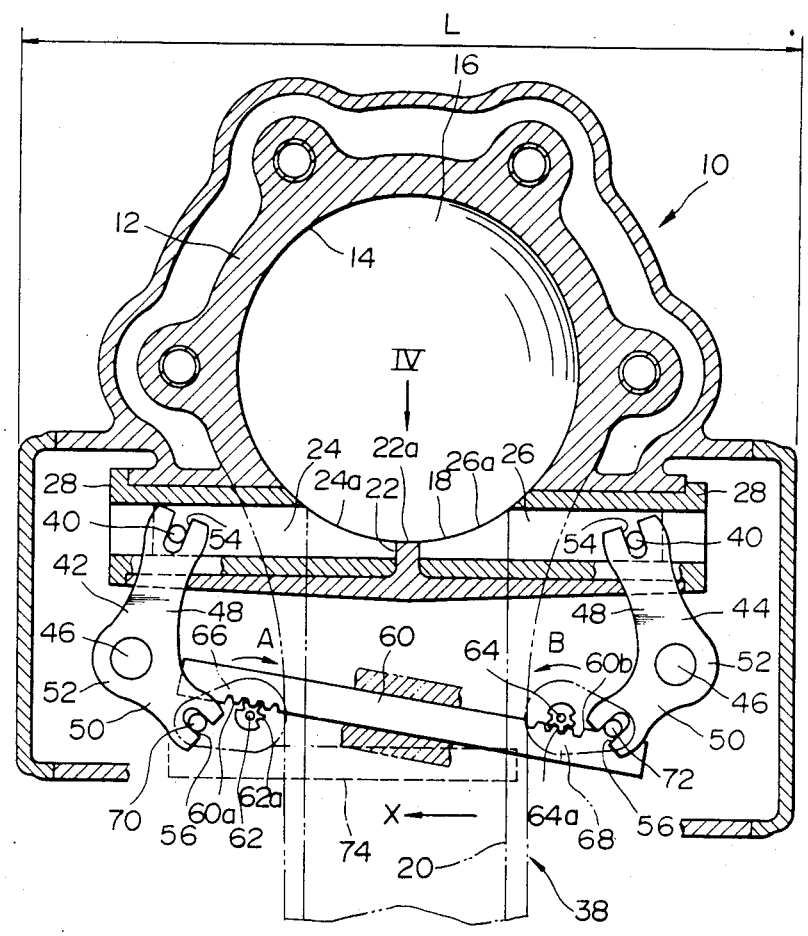
FIG. 3 is a cross-sectional view of a two-cycle engine provided in accordance with the present invention.

FIG. 3 shows a two-cycle internal combustion engine 10 which comprises a cylinder block 12 having a cylinder 14. A piston 16 is received in the cylinder 14 for reciprocal movement therealong. An exhaust port 18 is formed in a side or peripheral wall of the cylinder 14, and the exhaust port 18 is closed and opened by the peripheral wall of the piston 16 moving along the cylinder 14 as is well known in the art. An exhaust passage 20 is formed in the cylinder block 12 and opens to the exhaust port 18.

Figure 4A:
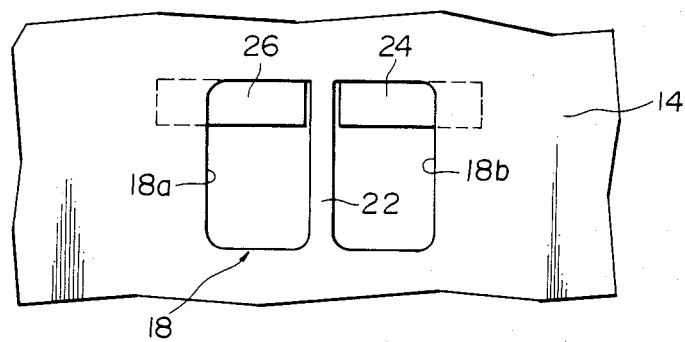
FIGS. 4A and 4B are views taken in the direction IV of FIG. 3, showing an exhaust port in partially-closed and fully-open conditions, respectively.
Figure 4B:
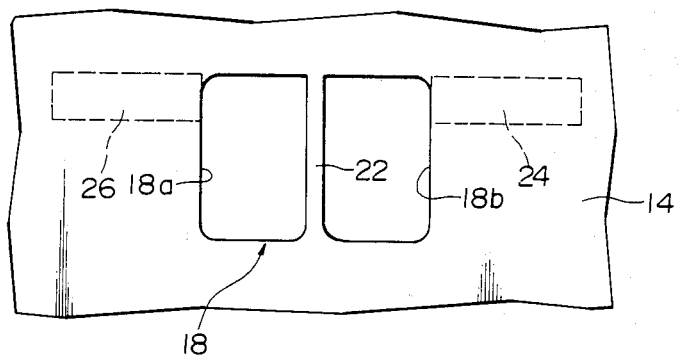

A partition wall or rib 22 extends between upper and lower portions of the wall of the exhaust passage 20 along the axis of the cylinder 14 centrally of the width of the exhaust port 18 and is disposed immediately adjacent to the exhaust port 18, so that the exhaust port 18 is divided by the partition wall 22 into a pair of first and second portions 18a and 18b which are juxtaposed circumferentially of the cylinder 14 (FIGS. 4A and 4B). An inner surface 22a of the partition wall 22 facing the cylinder 14 is smoothly continuous with the inner peripheral surface of the cylinder 14 longitudinally thereof.

Port timing control means is provided for varying an exhaust port timing, that is, a timing of the opening of the exhaust port 18 by the piston 16. The port timing control means comprises a pair of first and second elongated valves 24 and 26 each movable toward and away from each other. More specifically, a pair of coaxial guide tubes 28 and 28 are mounted on the cylinder block 12 with a common axis of these guide tubes being disposed perpendicular to the axis of the cylinder 14, each of the guide tubes having an axial bore of square cross-section. The opposed inner ends of the guide tubes 28 and 28 open to the exhaust passage 20 at an upper portion of the wall of the exhaust passage 20 and are disposed immediately adjacent to the exhaust port 18.

The first and second valves 24 and 26 of a square cross-section are received respectively in the axial bores of the guide tubes 28 and 28 for sliding movement therealong, that is, along respective straight paths perpendicular to the axis of the cylinder 14, between their respective open and closed positions. Each of the first and second valves 24 and 26 has at inner end portion a timing control surface 24a, 26a of an arcuate concave shape formed in one side thereof facing the cylinder 14. A curvature of each control surface 24a, 26a is substantially equal to or slightly greater than the curvature of the inner peripheral surface of the cylinder 14.

The first and second valves 24 and 26 are movable between respective closed positions (FIG. 4A) where their control surfaces 24a and 26a are extended into the exhaust passage 20 and close the upper end portions of the first and second portions 18a and 18b of the exhaust port 18, respectively, and respective open positions (FIG. 4B) where their control surfaces 24a and 26a are retracted from the exhaust port 18 to fully open it. In the closed positions of the first and second valves 24 and 26, their control surfaces 24a and 26a are substantially smoothly continuous with the inner peripheral surface of the cylinder 14, and the inner surface 22a of the partition wall 22 is substantially smoothly continuous with the control surfaces 24a and 26a circumferentially of the cylinder 14.

Figure 5:
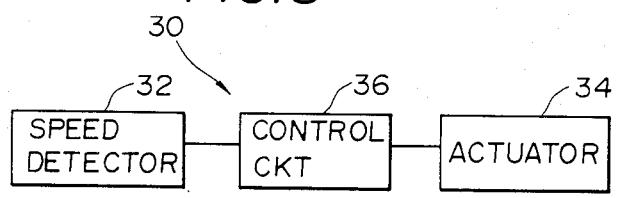
FIG. 5 is a block diagram of drive means for operating port control valve means incorporated in the engine of FIG. 3.

Drive means 30 is provided for moving the first and second valves 24 and 26 between their respective closed and open positions. As shown in FIG. 5, the drive means 30 comprises a speed detector 32 for detecting the engine speed, an actuator 34 such as a motor of the reversible type, and a control circuit 36 responsive to a detection signal from the speed detector 32 to control the operation of the actuator 34. Power transmission means 38 is provided for transmitting the output of the actuator 34 to the first and second valves 24 and 26 for moving them between their respective closed and open positions.

The power transmission means 38 will now be described. A pin 40 is fixedly mounted on the outer end of each of the first and second valves 24 and 26 remote from the control surface 24a, 26a. A pair of first and second levers 42 and 44 are mounted on the cylinder block 12 by respective bolts 46 for angular movement about the bolts 46 in a plane perpendicular to the axis of the cylinder 14. Each of the first and second levers 42 and 44 comprises a plate of a generally L-shape defined by a pair of first and second arms 48 and 50 disposed generally perpendicularly, the bolt 46 passing a corner portion 52 of each lever 42, 44 where the first and second arms 48 and 50 merge. The first arm 48 is longer than the second arm 50, and the opposite ends of each lever 42, 44 that is to say, the free ends of the first and second arms 48 and 50, have slots 54 and 56, respectively. The pins 40 on the first and second valves 24 and 26 are received respectively in the slots 54 of the first and second levers 42 and 44 in a slidable and pivotal fashion.

A rack rod 60 is mounted on the cylinder block 12 for sliding movement along an axis thereof, the rack rod 60 having a pair of first and second rack portions 60a and 60b on opposite sides thereof adjacent to opposite end portions thereof. A pair of first and second shafts 62 and 64 of a circular cross-section are mounted on the cylinder block 12 for angular movement about their respective axes which extend parallel to the axis of the cylinder 14, these two shafts 62 and 64 having at their upper end portions pinion portions 62a and 64a, respectively, which are in mesh with the first and second rack portions 60a and 60b of the rack rod 60, respectively. The pinion portions 62a and 64a are substantially equal in diameter to shank portions 62b and 64b of the shafts 62 and 64, respectively. A pair of first and second elongated plates 66 and 68 of a generally oval shape are fixedly secured at their one ends to the upper ends of the shafts 62 and 64, respectively, the oval plates 66 and 68 being disposed in a plane perpendicular to the shafts 62 and 64. The oval plates 66 and 68 are spaced upwardly respectively from the first and second levers 42 and 44 along the axis of the cylinder 14, and the other ends of the oval plates 66 and 68 are disposed in overlapping relation the second arms of the first and second levers 42 and 44, respectively. A pair of pins 70 and 72 are fixedly secured respectively to the other ends of the oval plates 66 and 68 and depend therefrom. The pins 70 and 72 are received in the slots 56 and 56 of the first and second levers 42 and 44, respectively. The first shaft 62 has at a lower end another pinion portion 62c. A drive shaft 74 is mounted on the cylinder block 12 for movement along an axis thereof which is perpendicular to the axis of the cylinder 14, the drive rod 74 having at one end portion a rack portion 74a which is in mesh with the pinion portion 62c of the shaft 62. The drive rod 74 is operatively connected to the output of the actuator 34 for being driven for movement along the axis thereof. The first shaft 62 has an elongated notch 62d formed in an outer peripheral surface thereof and extending along the axis thereof from the lower end of the pinion portion 62a to the lower end of the shaft 62, the notch 62d having a planar surface 62e extending along the axis of the first shaft.

Figure 6:
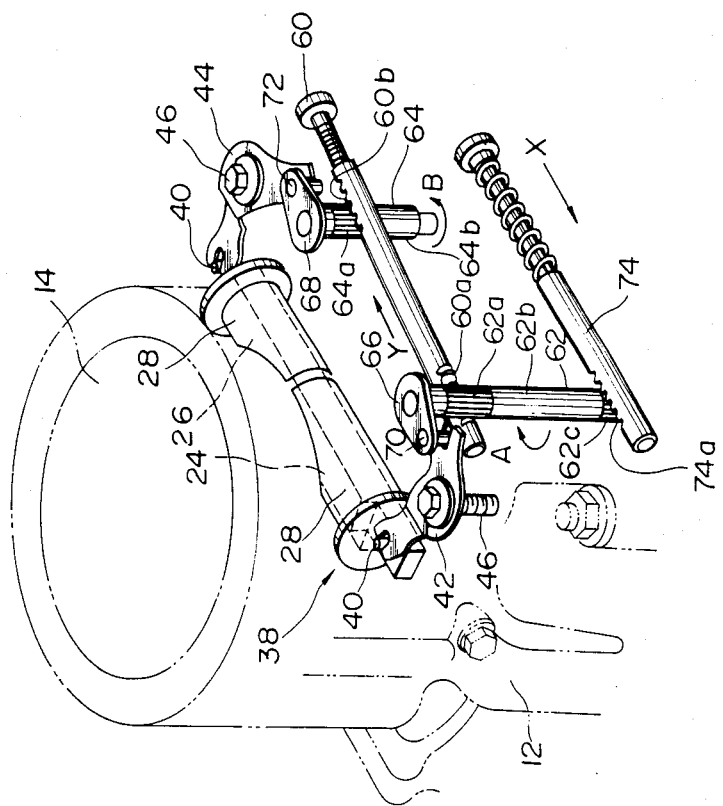
FIG. 6 is a perspective view of power transmission means.
Figure 7:
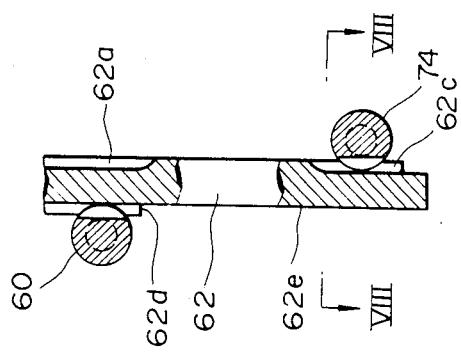
FIG. 7 a cross-sectional view of a first shaft incorporated in the power transmission means.

In operation, in a lower range of the engine speed, the first and second valves 24 and 26 are held in their respective closed positions (FIG. 4A) to close the upper portion of the exhaust port 18 to delay the opening of the exhaust port 18 by the piston 16, thereby achieving an improved power output of the engine 10. When the engine speed reaches a predetermined level, the actuator 34 is operated to move the drive rod 74 axially in a direction X (FIG. 6) to angularly move the first shaft 62 clockwise, that is, in a direction A (FIGS. 3 and 6), so that the first lever 42 is angularly moved about the bolt 46 counterclockwise through the oval plate 66 and the pin 70, thereby moving the first valve 24 from its closed to open position. At the same time, the angular movement of the first shaft 62 causes the rack rod 60 to axially move in a direction Y through the meshed pinion and rack portions 62a and 60a, so that the second shaft 64 is angularly moved in a direction B through the meshed rack and pinion portions 60b and 64a to angularly move the second lever 44 about the bolt 46 clockwise through the oval plate 68 and the pin 72, thereby moving the second valve 26 from its closed to open position in synchronism with the movement of the first valve 24 to fully open the exhaust port 18. And, when the engine speed drops below the predetermined level, the actuator 34 is operated to move the first and second valves 24 and 26 from their respective open to closed positions to close the upper portion of the exhaust port 18. Thus, the engine 10 produces improved power output over an entire effective range of the engine speed.

Figure 9:
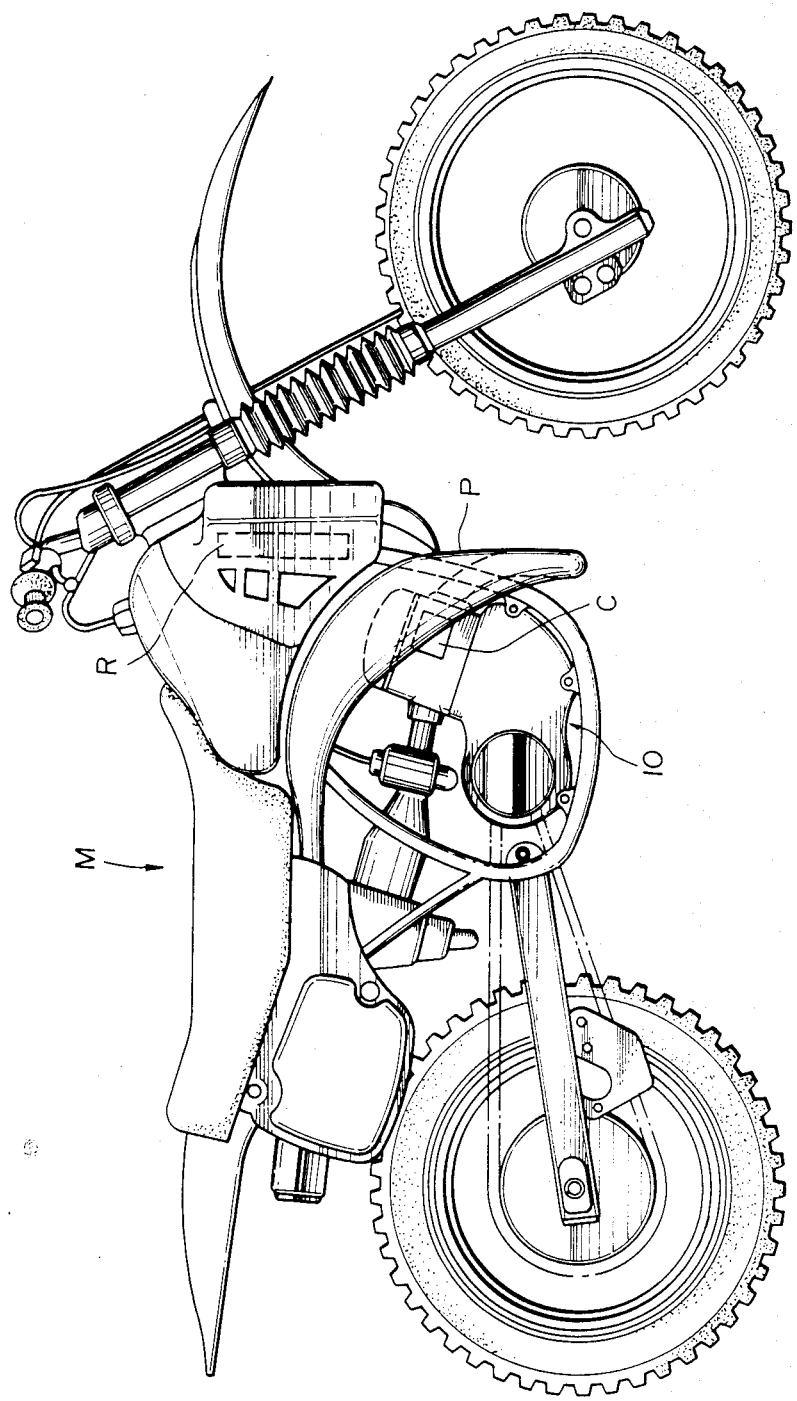
FIG. 9 is a side-elevational view of a motorcycle incorporating the engine of FIG. 3.

As described above, Each of the first and second levers 42 and 44 has an L-shape and is angularly-movably supported by the bolt 46 at its corner portion 52. The first and second shafts 62 and 64 are connected respectively to the first and second levers 42 and 44 through the oval plates 66 and 68, and the shorter arm 50 of the lever 42, 44 serves as an input side while the longer arm 42 serves as an output side. With this arrangement, the two shafts 62 and 64 can be positioned closer to each other, which permits the use of the rack rod 60 of a relatively small length. As a result, the width L of the engine 10 can be reduced. Therefore, when the engine 10 of this construction is mounted on a motorcycle M (FIG. 9), a cover member C, attached on the side of the cylinder block 12 at a position corresponding to the rack rod 60, is not extended unduly from the cylinder block 12 in the direction of the width of the engine 10. Therefore, an exhaust pipe P can be arranged in overlapping relation to the cover member C as viewed from the side of the motorcycle M. As a result, a sufficient space is available above the exhaust pipe P for accommodating a radiator R having a relatively large size and hence having a relatively large capacity.

In addition, since the pinion portions 62a and 64a of the first and second shafts 62 and 64 are not greater than but substantially equal in diameter to shank portions 62b and 64b of the shafts 62 and 64, respectively, the axes of the shafts 62 and 64 can be positioned closer to the axis of the rack rod 60. This also can contribute to the reduction of the engine size.

Figure 8:
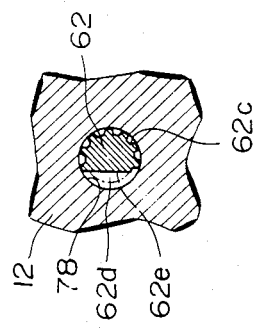
FIG. 8 is a cross-sectional view taken along the line VIII—VIII of FIG. 7.

Further, the first shaft 62 has the elongated notch 62d formed in an outer peripheral surface thereof and extending along the axis thereof from the lower end of the pinion portion 62a to the lower end of the shaft 62. When assembling the power transmission means 38, the first shaft 62 is mounted in a mounting hole 78 (FIG. 8), formed in the cylinder block 12 and extending along the axis of the cylinder 14, after the rack rod 60 is mounted in place. The first shaft 62 is introduced into the mounting hole 78 downwardly with the notch 62d facing the rack rod 60. Thus, the provision of the notch 62d facilitates the mounting the first shaft 62 on the cylinder block 12.

Figure 10:
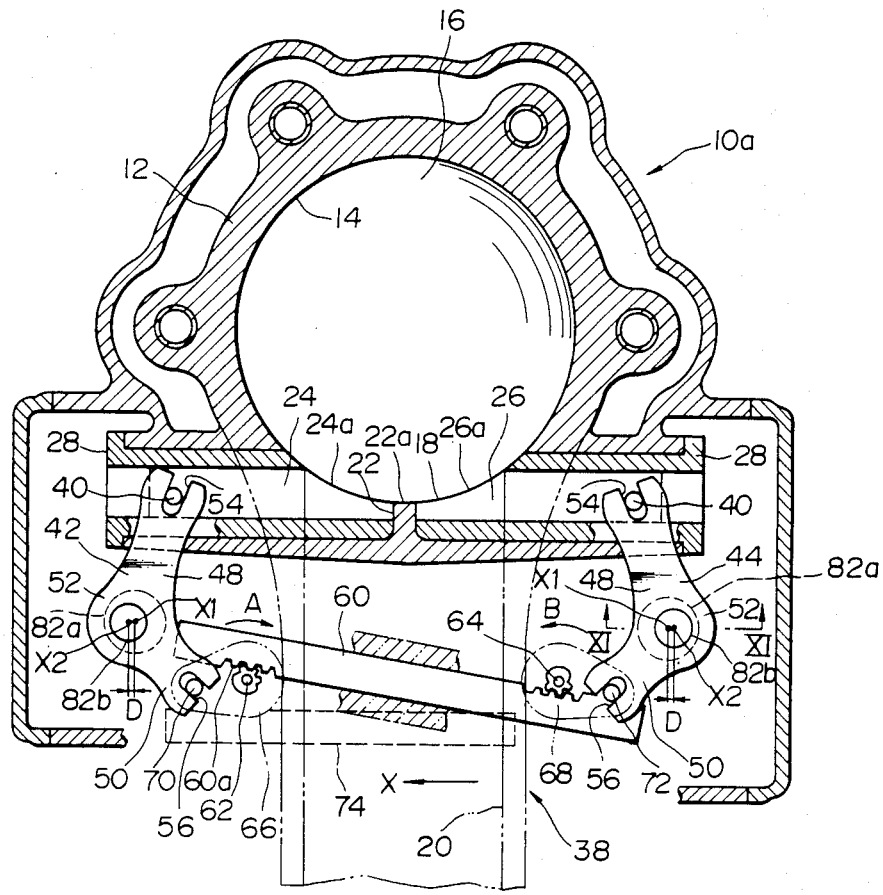
FIG. 10 is a view similar to FIG. 3 but showing a modified engine.
Figure 11:
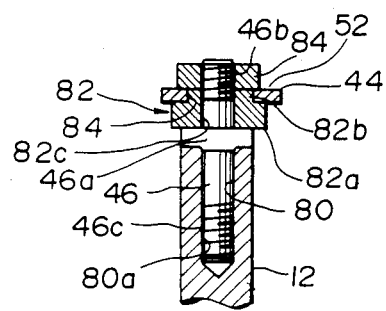
FIG. 11 a cross-sectional view taken along the line XI—XI of FIG. 10.

FIG. 10 shows a modified two-cycle engine 10a which differs from the engine 10 of FIG. 3 in that means is provided for properly adjusting the closed positions of the first and second valves 24 and 26. More specifically, as best shown in FIG. 11, each of a pair of bolts 46 of a circular cross-section, passing the corner portion 52 of a respective one of the first and second lever 42, 44, has a peripheral flange 46a intermediate opposite ends thereof. The bolt 46 has externally-threaded opposite end portions 46b and 46c, and that portion of the bolt 46 extending from the flange 46a to the lower end thereof is received in a hole 80 in the cylinder block 12, with the lower threaded portion 46c threadedly engaged with an internally-threaded lower portion 80a of the hole 80 to fix the bolt 46 to the cylinder block 12.

Each of the first and second levers 42 and 44 are mounted on a respective one of the shafts 62 and 64 through a collar 82 and a nut 84 for angular movement about an axis parallel to the axis of the cylinder 14. The collar 82 has a disc-shaped or circular base 82a of a uniform thickness and an eccentric circular boss 82b formed on an upper face of the base 82a in eccentric relation to an axis or center X1 of the disc-shaped base 82a, a lower face of the boss 82a being parallel to an upper face of the boss 82b. In other words, the axis X2 of the boss 82b is spaced a distance D from the axis X1 of the disc-shaped base 82a in a direction perpendicular to the axis of the cylinder 14, as best shown in FIG. 10. The collar 82 has a circular aperture 82c extending through the base 82a and the boss 82b, and the collar 82 is fitted on the bolt 46 with the bolt 46 passing through the aperture 82c and with the lower face of the base 82a held against the flange 46a. The axis X1 of the base 82a and the axis of the bolt 46 are substantially aligned with each other, and therefore the axis X2 of the boss 82 is eccentric or offset from the axis of the bolt 46. Each of the first and second lever 42 and 44 have a circular aperture 86 formed through the corner portion 52. The circular boss 82b is fitted in the circular aperture 84 of the lever 42, 44, and the nut 84 is threaded on the upper threaded portion 46b and is held against the upper face of the boss 82b to hold the collar 82 against movement relative to the bolt 46. Thus, each of the first and second levers 42 and 44 are angularly movable about the axis X2 of the boss 82b. The thickness of the boss 82b of the collar 82 is slightly greater than the thickness of the lever 42, 44. This permits the angular movement of the lever 42, 44 about the axis X2 of the boss 82c.

When the power transmission means 38 is to be assembled, the angular position of the boss 82b of the collar 82 with respect to the bolt 46 is set so that each of the first and second valves 24 and 26 can be so arranged as to be moved accurately into its closed position. In addition, in the course of use of the engine 10a, when each of the first and second valves 24 and 26 is not brought accurately into its closed position, this can be easily overcome by loosening the nut 84 and angularly moving the collar 82 slightly with respect to the bolt 46.

What is claimed is:

1. A two-cycle engine comprising:
   (a) a cylinder block including a cylinder having an axis, and an exhaust port formed in a side wall of said cylinder;
   (b) a piston received in said cylinder for reciprocal movement along the axis of said cylinder for closing and opening said exhaust port; and
   (c) port timing control means for varying a timing of the opening of said exhaust port by said piston, said port timing control means comprising (i) a pair of first and second valves movable along respective straight paths disposed generally perpendicular to the axis of said cylinder into and out of respective closed positions where said first and second valves cooperate with each other to close part of said exhaust port; (ii) power transmission means; and (iii) drive means for driving said first and second valves to move into and out of their respective closed positions in accordance with a speed of said engine through said power transmission means;
   (d) said power transmission means comprising (i) a pair of first and second shafts mounted on said cylinder block for angular movement about their respective axes disposed generally parallel to the axis of said cylinder, each of said shafts having a pinion portion; (ii) a rack rod disposed generally perpendicular to said shafts and being movable along an axis thereof, said rack rod having a pair of first and second rack portions spaced along the length thereof and meshingly engaging said pinion portions of said first and second shafts, respectively, in such a manner that the angular movement of said first shaft causes the angular movement of said second shaft through said rack rod; (iii) a pair of first and second levers of a generally L-shape defined by a pair of a first arm and a second arm extending generally perpendicularly from said first arm, each of said levers having a corner portion where said first and second arms merge, each lever being angularly movable about an axis passing through said corner portion and disposed generally parallel to said shafts, said first and second arms of each lever being engaged respectively with a respective one of said first and second valves and a respective one of said first and second shafts in such a manner that the angular movements of said first and second shafts cause the angular movements of said first and second levers, respectively, to move said first and second valves into and out of their closed positions, and said first shaft being operatively connected to said drive means for being driven for angular movement.

2. A two-cycle engine according to claim 1, in which said first arm of each of said first and second levers is longer than said second arm.

3. A two-cycle engine according to claim 1, in which an elongated plate is fixedly secured at one end to each of said first and second shafts and is disposed generally perpendicular to said shaft, the other ends of said elongated plates being disposed respectively in overlapping relation to free ends of said second arms of said first and second levers and being pivotally connected thereto.

4. A two-cycle engine according to claim 3, in which a first pin is fixedly mounted on each of said first and second valves, there being provided a second pin fixedly secured to the other end of each of said elongated plates, said first and second arms of each of said first and second levers having a pair of first and second slots, respectively, said pair of first and second pins being pivotally received respectively in said pair of first and second slots.

5. A two-cycle engine according to claim 1, in which said power transmission means further comprises a drive shaft mounted on said cylinder block for movement along an axis thereof which is generally perpendicular to the axis of said cylinder, said first shaft having a second pinion portion, said drive shaft having a rack portion meshingly engaging said second pinion portion, said drive shaft being operatively connected to said drive means for being driven for movement along the axis thereof for angularly move said first shaft through the meshing engagement between said second pinion and said rack portion of said drive shaft.

6. A two-cycle engine according to claim 1, in which each of said first and second shafts is of a circular cross-section and includes a shank portion and said pinion portion, said pinion portion being substantially equal in diameter to said shank portion.

7. A two-cycle engine according to claim 6, in which said pinion portion of each of said first and second shafts is provided on one end portion of each of said first and second shafts, each shaft having an elongated notch formed in an outer peripheral surface thereof and extending along the axis thereof between said pinion portion and the other end of said shaft, said cylinder block having a mounting hole therein and extending along the axis of said cylinder, each shaft being received in said mounting hole with said pinion portion extending exteriorly of said hole.

8. A two-cycle engine according to claim 1, in which a pivot shaft of a circular cross-section is fixedly mounted on said cylinder block and extending parallel to the axis of said cylinder, there being provided a collar having a base and an eccentric boss of a circular cross-section formed integrally on one side of said base, said collar having a circular aperture extending through said base and said boss, said pivot shaft being fitted in said aperture of said collar in a manner to permit a rotation of said collar about the axis of said pivot shaft relative to said pivot shaft, the said eccentric boss having an axis disposed in parallel and eccentric relation to the axis of said pivot shaft, each of said first and second levers having a circular aperture extending through said corner portion, said boss of said collar being fitted in said aperture of each lever so that said lever is angularly movable about the axis of said boss, and there being provided fastening means for releasably fixing said collar to said pivot shaft to hold the former against rotation relative to the latter.

* * * * *